P. LAWRENSON.
Broadcast-Seeder.
No. 14,630. Patented Apr. 8. 1856.
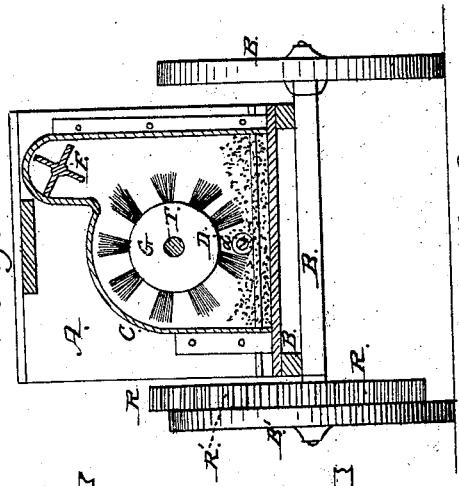
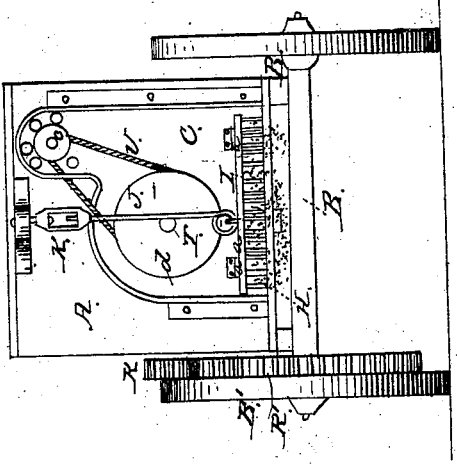
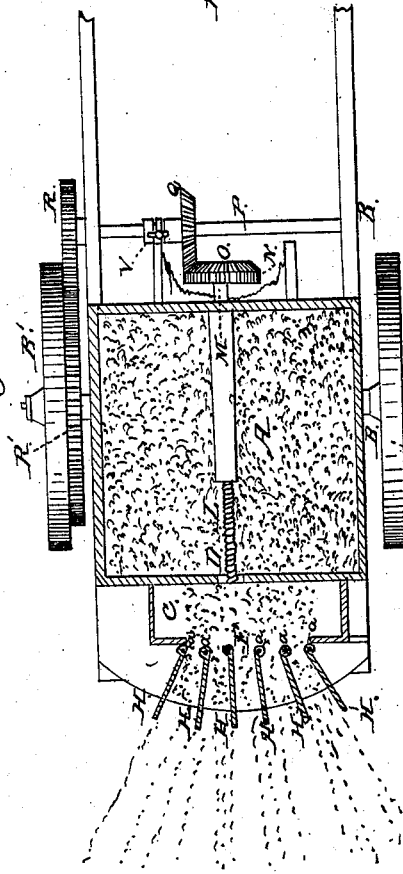
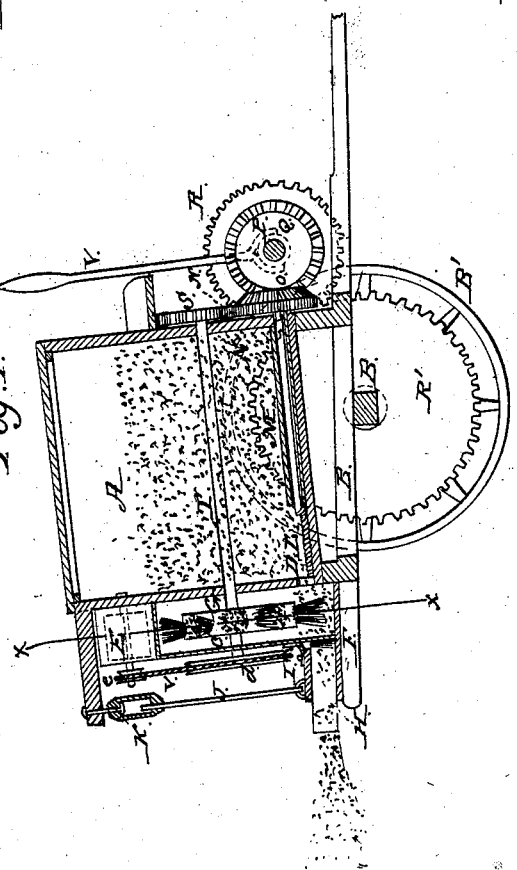

UNITED STATES PATENT OFFICE.

PETER LAWRENSON, OF NEW YORK, N. Y.

IMPROVEMENT IN MACHINES FOR SOWING SEED BROADCAST.

Specification forming part of Letters Patent No. 14,630, dated April 8, 1856.

*To all whom it may concern:*

Be it known that I, PETER LAWRENSON, of the city, county, and State of New York, have invented a new and useful Improvement in Broadcast Seed-Sowers; and I do hereby declare that the following is a full, clear, and exact description of the same, reference being had to the accompanying drawings, forming part of this specification, in which—

Figure 1 is a vertical central section of a broadcast seed-sower constructed after my invention. Fig. 2 is an end view. Fig. 3 is a horizontal section; Fig. 4, a vertical transverse section through the line $x\ x$ in Fig. 1.

Similar letters of reference in each of the several figures indicate corresponding parts.

The nature of my invention consists in the employment of a fan-blower in connection with a brush-wheel in such relation to the hopper that such seed as adhere closely together are separated after coming from the hopper and sown broadcast over the field in a uniform and expeditious manner.

To enable others skilled in the art to make and use my invention, I will proceed to describe its construction and operation.

A is the hopper or seed-box, mounted inclining backward upon a carriage, B; C, the fan-case. It is placed at the rear of the hopper, and communicates with the same by a feed-opening, D, near the bottom of the hopper.

E is the fan. It is placed in the upper part of the case C.

F is an escape-passage for the seed from the fan-case. It is situated at the bottom of the case.

G is the revolving brush-wheel, also arranged in the fan-case in such relation to the feed-opening D of the hopper that its brushes strike the seed as they come through the opening D and thoroughly separate them, in case they are fine and adhere closely together, before they are acted upon and discharged by the blast of the fan. H are the vanes for giving direction to the seed as they are discharged by the fan through the opening E. These vanes are arranged in front of the opening E, and turn separately on vertical pins $a$, so that they may be set more or less oblique to one another, and thus serve for regulating the extent to which the seed are to be scattered.

I is a hinged clamping-board, resting on the top of the vanes; and J is a screw-rod, with a link-nut, K, for operating upon said board in a manner to cause it to firmly clamp the vanes in the position they may be set. By this arrangement, by simply raising the board I by turning the nut K either or all of the vanes may be readily adjusted as desired, and set so by again lowering the board by turning the screw in an opposite manner.

L is the feed-screw. It is arranged on the bottom of the hopper, it being formed on the end of a shaft, M, which passes through the front of the hopper and has a spur-wheel, N, secured fast on it.

O is a bevel-wheel cast on the face of the spur-wheel N.

P is a shaft arranged in front of the seed-hopper. It carries a bevel-wheel, Q, which gears into P. It also carries a spur-wheel, R, which gears into a large spur-wheel, R', on the wheel B' of the carriage B.

S is a spur-wheel on the shaft T of the brush-wheel, and gearing into the spur-wheel N on the feed-screw shaft.

U is a band passing from a pulley, $c$, on the blower-shaft to a pulley, $d$, on the brush-wheel shaft, and thus combining the fan with the wheel of the carriage B'.

V is a clutch-lever for throwing the bevel-wheel Q in and out of connection with the bevel-wheel O, and thus disconnecting the feed-screw brush-wheel and fan from the wheel B', and thereby stopping their operation.

Operation: The hopper is filled with seed and covered up tight, the bevel-wheel Q thrown into gear with the bevel-wheel O, and the vanes H are adjusted and set at the required angle, or according as it is desired to have the seed sown. The carriage is now drawn forward, and consequently the feed-screw, brush-wheel, and fan caused to revolve, and the screw caused to feed out the seed through the opening D into the fan-case. As soon as the seed enters the fan-case it is operated upon by the brush-wheel and thoroughly separated, and almost simultaneously with its being thus operated it is discharged by the blast of the fan, through the openings F with great force, and, passing along the flaring passages formed by the vanes, caused to have a positive direction, and thus prevented from being spread or scattered to too great an extent, or any more than desired, by the blast of the fan.

This machine is quite simple, and is well adapted to sowing various kinds of small seed, and with it, if the fan has a certain number of revolutions, it has been found that seed can be scattered uniformly over a space of from twenty to thirty feet at each operation; and therefore a farmer can sow a field of two hundred acres, which now commonly occupies two days, in about two hours, and in a more regular and perfect manner.

What I claim as my invention, and desire to secure by LettersPatent, is—

The employment of a fan-blower in connection with a brush-wheel, and in proper relation to the discharge of a seed-hopper, substantially as and for the purpose set forth.

PETER LAWRENSON.

Witnesses:
R. W. FENWICK,
WM. TUSCH.